(12) United States Patent
Schäfer et al.

(10) Patent No.: US 11,964,570 B2
(45) Date of Patent: Apr. 23, 2024

(54) METHOD FOR OPERATING AN ELECTRIC VEHICLE AND ELECTRIC VEHICLE

(71) Applicant: SEW-EURODRIVE GMBH & CO. KG, Bruchsal (DE)

(72) Inventors: Jens Schäfer, Graben-Neudorf (DE); Jan Becker, Stutensee (DE); Gero Bockelmann, Bruchsal (DE); Matthias Hauck, Schwetzingen (DE); Christian Schumann, Kaiserslautern (DE); Josef Schmidt, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 91 days.

(21) Appl. No.: 17/787,647

(22) PCT Filed: Dec. 2, 2020

(86) PCT No.: PCT/EP2020/025557
§ 371 (c)(1),
(2) Date: Jun. 21, 2022

(87) PCT Pub. No.: WO2021/121654
PCT Pub. Date: Jun. 24, 2021

(65) Prior Publication Data
US 2022/0410719 A1    Dec. 29, 2022

(30) Foreign Application Priority Data

Dec. 18, 2019  (DE) .......................... 102019008789.5

(51) Int. Cl.
*B60L 3/04*   (2006.01)
*B60L 50/40*  (2019.01)
*H02J 7/34*   (2006.01)

(52) U.S. Cl.
CPC ................. *B60L 3/04* (2013.01); *B60L 50/40* (2019.02); *H02J 7/345* (2013.01); *H02J 2310/40* (2020.01)

(58) Field of Classification Search
CPC ... B60L 3/04; B60L 50/40; H02J 7/345; H02J 2310/40
See application file for complete search history.

(56) References Cited

U.S. PATENT DOCUMENTS

| 5,323,098 A | 6/1994 | Hamaguchi |
| 5,793,189 A | 8/1998 | Kawaguchi |

(Continued)

FOREIGN PATENT DOCUMENTS

| DE | 69119168 T2 | 8/1996 |
| DE | 19545544 A1 | 12/1996 |

(Continued)

OTHER PUBLICATIONS

International Report on Patentability issued in corresponding International Application No. PCT/EP2020/025557 dated May 17, 2022, pp. 1-6, English Translation.

(Continued)

*Primary Examiner* — Jared Fureman
*Assistant Examiner* — Duc M Pham
(74) *Attorney, Agent, or Firm* — CARTER, DELUCA & FARRELL LLP

(57) ABSTRACT

In a method for operating an electric vehicle, including an electrical drive device for driving the vehicle, a control device for controlling the driving of the vehicle, a first energy storage device for supplying the control device with a first DC voltage, a second energy storage device for supplying the drive device with a second DC voltage, and an energy supply unit providing an output DC voltage, the first energy storage device is connected to the energy supply unit (Continued)

via a converter device, the second energy storage device is connected to the energy supply unit, the converter device converts the output DC voltage into the first DC voltage, a first power flow from the first energy storage device to the second energy storage device is prevented and a second power flow from the second energy storage device to the first energy storage device is prevented.

24 Claims, 3 Drawing Sheets

(56) References Cited

U.S. PATENT DOCUMENTS

| | | | |
|---|---|---|---|
| 6,265,851 | B1 | 7/2001 | Brien |
| 7,956,569 | B2 | 6/2011 | Welchko |
| 8,836,251 | B2 | 9/2014 | Tabatabaei |
| 11,067,050 | B2 | 7/2021 | Shields |
| 2008/0277173 | A1 | 11/2008 | Midrouillet |
| 2011/0100735 | A1* | 5/2011 | Flett ............ B60L 50/13 |
| | | | 180/65.285 |
| 2012/0037440 | A1 | 2/2012 | Baer |
| 2012/0038216 | A1* | 2/2012 | Berry ............ B60L 50/64 |
| | | | 307/77 |
| 2016/0152129 | A1 | 6/2016 | West |
| 2016/0297307 | A1 | 10/2016 | Hinterberger |
| 2017/0129342 | A1 | 5/2017 | Tajima |
| 2021/0178910 | A1 | 6/2021 | Knoedler |

FOREIGN PATENT DOCUMENTS

| | | | | |
|---|---|---|---|---|
| DE | 102007002242 | A1 | 7/2008 | |
| DE | 102008034668 | A1 | 5/2009 | |
| DE | 102009014386 | A1 * | 9/2010 | ........ B60L 11/1803 |
| DE | 102009014386 | A1 | 9/2010 | |
| DE | 102009017556 | A1 | 10/2010 | |
| DE | 102010008917 | A1 | 8/2011 | |
| DE | 202015004177 | U1 | 7/2015 | |
| DE | 202016002428 | U1 | 6/2016 | |
| DE | 102015004701 | A1 | 10/2016 | |
| DE | 102015004701 | A1 * | 10/2016 | ........ B60L 11/185 |
| DE | 102016007088 | B3 | 6/2017 | |
| DE | 102017005153 | A1 | 12/2017 | |
| DE | 102018111469 | A1 | 11/2018 | |
| DE | 102017220805 | A1 | 5/2019 | |
| DE | 102018206582 | A1 | 10/2019 | |

OTHER PUBLICATIONS

International Search Report issued in corresponding International Application No. PCT/EP2020/025557 dated Mar. 12, 2021, pp. 1-2, English Translation.

* cited by examiner

METHOD FOR OPERATING AN ELECTRIC VEHICLE AND ELECTRIC VEHICLE

FIELD OF THE INVENTION

The present invention relates to a method for operating an electric vehicle and to an electric vehicle.

BACKGROUND INFORMATION

An electric vehicle may be provided in a driverless mobile assistance system. Alternatively, such a vehicle can also be referred to as a driverless transport vehicle (DTV) or AGV (Automated Guided Vehicle).

German Patent Document No. 10 2007 002 242 describes a driverless transport vehicle for transporting loads. Such a load transport can be referred to as intralogistics application. The driverless transport vehicle is inductively supplied with energy.

German Patent Document No. 195 45 544 describes a floor conveyor rail system, in which the vehicles are supplied with electrical energy via conductor lines. In order to be able to operate the vehicle even in the absence of an external energy supply, it is described to use electrolyte or gold cap capacitor storage devices, also referred to as ultracapacitors, supercapacitors, or double layer capacitors, as an electrical energy source.

U.S. Pat. No. 6,265,851 describes an ultracapacitor current supply for an electric vehicle. This electric vehicle has two energy storage devices which can be used alternatively to drive the motor vehicle.

European Patent Document No. 2 419 364 describes a driverless transport system, which has two energy storage devices—a double layer capacitor device and a battery device. In normal operation, the double layer capacitor device supplies the drive device, that is to say the engine, with energy. In an emergency, that is to say when the voltage in the double layer capacitor device falls below a certain level, a switch to battery operation occurs. The drive device is then supplied with energy exclusively by the battery device until the double layer capacitor device is recharged at a charging station.

German Patent Document No. 10 2017 005 153 describes a method for operating an electric vehicle and an electric vehicle, in which this vehicle has a hybrid storage device and a double layer capacitor device. Both storage devices can alternatively supply the drive device with energy.

U.S. Pat. No. 5,793,189 describes a device for preventing overcharging of batteries used in electric vehicles.

SUMMARY

Example embodiments of the present invention provide an electric vehicle, e.g., a driverless mobile assistance system, which has two different types of energy storage devices.

According to an example embodiment of the present invention, in a method for operating an electric vehicle, e.g., a driverless mobile assistance system (MAS) of an intralogistics application, the vehicle includes an electrical drive device for the driving movement, e.g., the traction, of the vehicle, a control device for controlling the driving movement of the vehicle, a first energy storage device, e.g., a rechargeable battery storage device, for supplying the control device with a first DC voltage, a second energy storage device, e.g., a double layer capacitor device and/or which can be charged or discharged more rapidly than the first energy storage device, for supplying the drive device with a second DC voltage which, e.g., is greater than the first DC voltage, and an energy supply unit which provides, e.g., periodically, an output DC voltage, the first energy storage device is connected via a converter device to the energy supply unit, the second energy storage unit is connected to the energy supply unit, the converter device converts the output DC voltage into the first DC voltage, e.g., the first DC voltage is smaller than the output DC voltage, a first power flow from the first energy storage device to the second energy storage device is prevented, and a second power flow from the second energy storage device to the first energy storage device is prevented.

An advantage is that the use of the two energy storage devices is separate. The second energy storage device provides necessary drive energy, and the first energy storage device provides energy for the control device. The second energy storage device is generally used almost entirely during travel and is recharged during pauses of the logistics process. The capacity of the second energy storage device can be adjusted to the requirements of the logistics process and depends substantially on the driving route without external energy supply, e.g., when the energy supply unit provides no power. In the case of known driving routes, the capacity of the second energy storage device can therefore be selected accordingly and adapted optimally to the requirements. However, although the first energy storage device is also recharged in the logistics pauses, it is configured so that its energy can supply the control electronics for prolonged time periods. Its capacity can thus be adjusted to the requirements of the logistics process and not only depends on the driving time without external energy supply but is also substantially determined by unforeseen disturbances which occur in the logistics process and lead to downtimes of the vehicle. Disturbances can be, for example, unexpected obstacles or persons along the driving route but also delays during the coupling to other processes which are not yet ready. The decoupling of the energy storage devices thus provides the targeted storage configuration for the corresponding load. Thus, for example, for an application with longer downtimes of the mobile assistance system, the second energy storage device only needs to be configured for the driving (route). The supply of the control electronics, e.g., during the entire process, is assumed by the first energy storage device which is, for example, configured for the longest expected time until the next charging.

For example, the first energy storage device has a higher energy density and therefore has a lower power density and a lower number of possible charge/discharge cycles in comparison to the second energy storage device. The second energy storage device can be charged and discharged more rapidly than the first energy storage device.

The first energy storage device is, for example, configured as a battery storage device. An example of a battery storage device is an arrangement of one or more secondary electrochemical elements, e.g., nickel- and/or iron-based elements. Such a secondary electrochemical element includes a negative electrode, a positive electrode, a porous separator which separates the negative and the positive electrodes from one another as well as, e.g., an aqueous alkaline electrolyte with which the electrodes and the separator are soaked. Such a secondary nickel- and/or iron-based electrochemical element, like a capacitor, is capable of delivering very fast high pulsed currents but otherwise it has more of a battery-like behavior, e.g., the capacitor equations $Q = C\,U$ and $W = \frac{1}{2}\,C\,U^2$ do not apply to this battery storage device. Such a battery storage device has a higher cycle stability. This cycle stability is in the range between 1,000 and 20,000.

Charge and discharge cycles can thus be carried out more frequently, before the power criteria of the battery storage device are no longer met. In addition, the battery storage device has an overcharge stability and a deep discharge protection. It can be rapidly charged by up to 15 C. The battery storage device nevertheless can be charged and discharged more slowly than a double layer capacitor device which is an exemplary configuration for the second energy storage device. The double layer capacitor device is characterized in that it can be charged and completely discharged to zero voltage in a few seconds. Its cycle stability is in the range of 1 million.

According to example embodiments, the first power flow is always, e.g., at any point in time, prevented, and the second power flow is always, e.g., at any point in time, prevented. This formulation should be understood to mean that the method is carried out so that a transfer or energy transfer between the two energy storage devices is prevented not only periodically but permanently, e.g., always. Thus, it is not possible at any point in time to use the charge or energy once it is stored in an energy storage device for charging the other energy storage device. The advantage is that the use of the two energy storage devices is always completely separate. The second energy storage device always provides exclusively the necessary drive energy, and the first energy storage device always provides only the energy for the control device. As discussed further below, at least the prevention of the second power flow can be implemented by structural components, for example, a diode, or by closed-loop control measures.

According to example embodiments, an output current of the energy supply unit has a value which is substantially constant over time, e.g., the output current is regulated to this constant value. Therefore, it is possible to charge the second energy storage device with constant current until a specified maximum voltage has been reached, e.g., the energy supply unit is deactivated subsequently, e.g., when the maximum voltage is applied on the second energy storage device. An advantage is that the control of the energy supply unit can occur. For example, a closed-loop control of the output current to a constant value can be carried out.

According to example embodiments, energy is supplied to the energy supply unit with contact or without contact.

An advantage in the case of the energy supply with contact is that a simple charging of the energy storage, for example, by a plug, is provided.

An advantage in the case of contact-free energy supply is that a safe charging of the energy storage, for example, by induction, is provided.

According to example embodiments, the energy supply unit includes an inverter which is supplied from a secondary inductance of the electric vehicle, and which, for example, is connected to a capacitor in series or parallel such that the resonance frequency of the oscillation circuit formed in this manner is equal to the frequency of an AC current impressed on a stationarily arranged primary inductance. By the inductive energy transfer, the safety is also increased and no wear of otherwise necessary charging contacts occurs. In addition, a configuration that is safe to touch can be implemented.

According to example embodiments, energy is periodically supplied to the energy supply unit during travel.

An advantage is that the energy supply can take place over sections of the driving route and as a result the two energy storage devices can either be recharged or their charging state is kept fully charged and thus their downtime can be increased, since they are exposed to as few full charging cycles as possible, e.g., they are not often completely charged and discharged. Aging is thus reduced thereby. The energy supply can take place, for example, with contact by conductor lines. Alternatively, a stationarily arranged primary conductor is arranged along the driving route, via which energy is transferred inductively to a secondary inductance arranged in the electric vehicle.

According to example embodiments, the first power flow is prevented in that the converter device is configured as a unidirectional, e.g., electrically isolated, DC/DC converter.

An advantage is that the first power flow is prevented in the case of simultaneous voltage conversion. An advantage of the electrically isolated DC/DC converter is that the two voltage levels $U_0$ and $U_2$ are galvanically separated and thus an electrically safe separation of drive supply and electronics supply can be provided. Since only one power flow direction is provided, a cost-effective electronic circuit can also be used in spite of electrical isolation. This would not be possible in the case of a bidirectional circuit.

According to example embodiments, the second power flow is prevented by a diode arranged between the second energy storage device and the converter device.

An advantage is that the prevention of the second power flow is implemented.

According to example embodiments, the second energy storage device is directly connected to the energy supply unit and/or directly connected to the power converter, and the second power flow is prevented in that the second DC voltage is monitored by a gradient evaluation, in which, in the case of a positive gradient of the voltage level of the second DC voltage, the converter device is activated, e.g., if the second DC voltage is greater than a minimum voltage value, and, in the case of a non-positive gradient of the voltage level of the second DC voltage, the converter device is deactivated.

An advantage is that, between the energy supply unit and the second energy storage device and/or between the converter device and the second energy storage device, no additional power flow-controlling or power flow-preventing electronic circuits or other components such as, for example, diodes or switches, are necessary in order to prevent a transfer between the energy storages. This is what is meant by the formulation "directly connected." "Directly connected" thus does not rule out that, for example, resistors or inductances are arranged between second energy storage device and energy supply unit or converter device. The prevention of the power flows is carried out exclusively by the converter device and can be controlled there. A positive voltage gradient means that the second DC voltage increases. The increase of the voltage can occur, on the one hand, in that the external energy supply unit supplies energy. On the other hand, by electric motors operated as generator, energy can also be fed back to the drive device. In this configuration, it is thus possible that the first energy storage device is charged by drive motors operated as generator, e.g., during a braking process of the vehicle.

However, it is provided that this charging does not occur using energy stored in the second energy storage device. A non-positive gradient of voltage level of the second DC voltage means that the second DC voltage decreases and thus energy is drawn from the second energy storage device. Since the converter device is deactivated, it is provided that the energy of the second energy storage device is used exclusively to supply the drive device and, e.g., is not used to charge the first energy storage device.

Alternatively, it is also possible that the mentioned gradient evaluation is used even though the second energy storage device is not directly connected to the energy supply unit, e.g., is indirectly connected, for example, via a diode, to the energy supply unit or is indirectly connected to the converter device. The features "direct connection" and "gradient evaluation" are thus not inseparably linked to one another. The gradient evaluation provides for the implementation of a direct connection.

According to example embodiments, the first DC voltage for charging the first energy storage device is varied, e.g., by the control device. An advantage is that the first energy storage device can be charged with a precisely settable current, for example, in accordance with a charging characteristic curve.

According to example embodiments, the second energy storage device is configured such that more current can be received than can be provided by the energy supply unit.

An advantage is that the energy supply unit can be protected against overload. For this purpose, only a voltage limitation is necessary, which, when the maximum acceptable operating voltage of the second energy storage device has been reached, deactivates the energy supply unit.

According to an example embodiment of the present invention, in a device for supplying a first load of an electric vehicle, e.g., a driverless mobile assistance system of an intralogistics application, with a first DC voltage and for supplying a second load with a second DC voltage, the device includes a first energy storage device, e.g., a rechargeable battery storage device, a second energy storage device, e.g., a double layer capacitor device and/or which can be charged and discharged more rapidly than the first energy storage device, and an energy supply unit from which, e.g., periodically, an output DC voltage can be drawn, the first DC voltage can be drawn from the first energy storage device, the second DC voltage, which, e.g., is greater than the first DC voltage, can be drawn from the second energy storage device, the first energy storage device is connected to the energy supply unit via a converter device, the second energy storage device is connected to the energy supply unit, the converter device converts the output DC voltage into the first DC voltage, e.g., the first DC voltage is smaller than the output DC voltage, the device is configured such that a first power flow from the first energy storage device to the second energy storage device is prevented and that a second power flow from the second energy storage device to the first energy storage device is prevented.

An advantage is that a decoupling of the energy storage devices is provided, and thus a targeted storage configuration for the corresponding loads is provided.

According to example embodiments, the energy supply unit is configured as controllable current source.

An advantage is that this can be implemented, e.g., for an inductively coupled energy supply unit.

According to example embodiments, the first energy storage device is removably arranged on the electric vehicle such that a replacement of the first energy storage device is provided.

An advantage is that, in the case of wear of the first energy storage device, it can be replaced. The first energy storage device is thus not firmly mounted or integrated in the vehicle but rather is detachably connected to the vehicle. For example, when a low voltage is used for the first DC voltage, the resulting advantage is that the first energy storage device can also be replaced by a person without corresponding training. For example, the first energy storage device is not configured for the lifespan of the vehicle and is therefore a wearing part.

According to example embodiments, on the first energy storage device, by a current measurement and/or voltage measurement, an overvoltage protection and/or an undervoltage protection and/or an overcurrent protection is/are provided and/or on the first energy storage device, by a temperature measurement, an overtemperature protection is provided and/or, on the second energy storage device, by a current measurement and/or voltage measurement, an overvoltage protection and/or an overcurrent protection is/are provided and/or, on the second energy storage device, by a temperature measurement, an overtemperature protection is provided.

An advantage is that the safety of the energy storage devices is increased and the energy storage devices are not destroyed.

This is particularly important in the case in which energy is fed back into an energy storage device by a load.

According to example embodiments, the electric vehicle includes the device described herein for supplying a first and a second load of the electric vehicle, the first load includes is a control device for controlling the driving movement of the vehicle and/or the second load is an electrical drive device for the driving movement, e.g., the traction, of the vehicle or a lifting device or a handling device.

An advantage is that control device on the one hand and controlled load on the other hand each have a separate energy supply.

Further features and aspects of example embodiments of the present invention are described in more detail below with reference to the appended schematic Figures.

DETAILED DESCRIPTION

Figure 1:
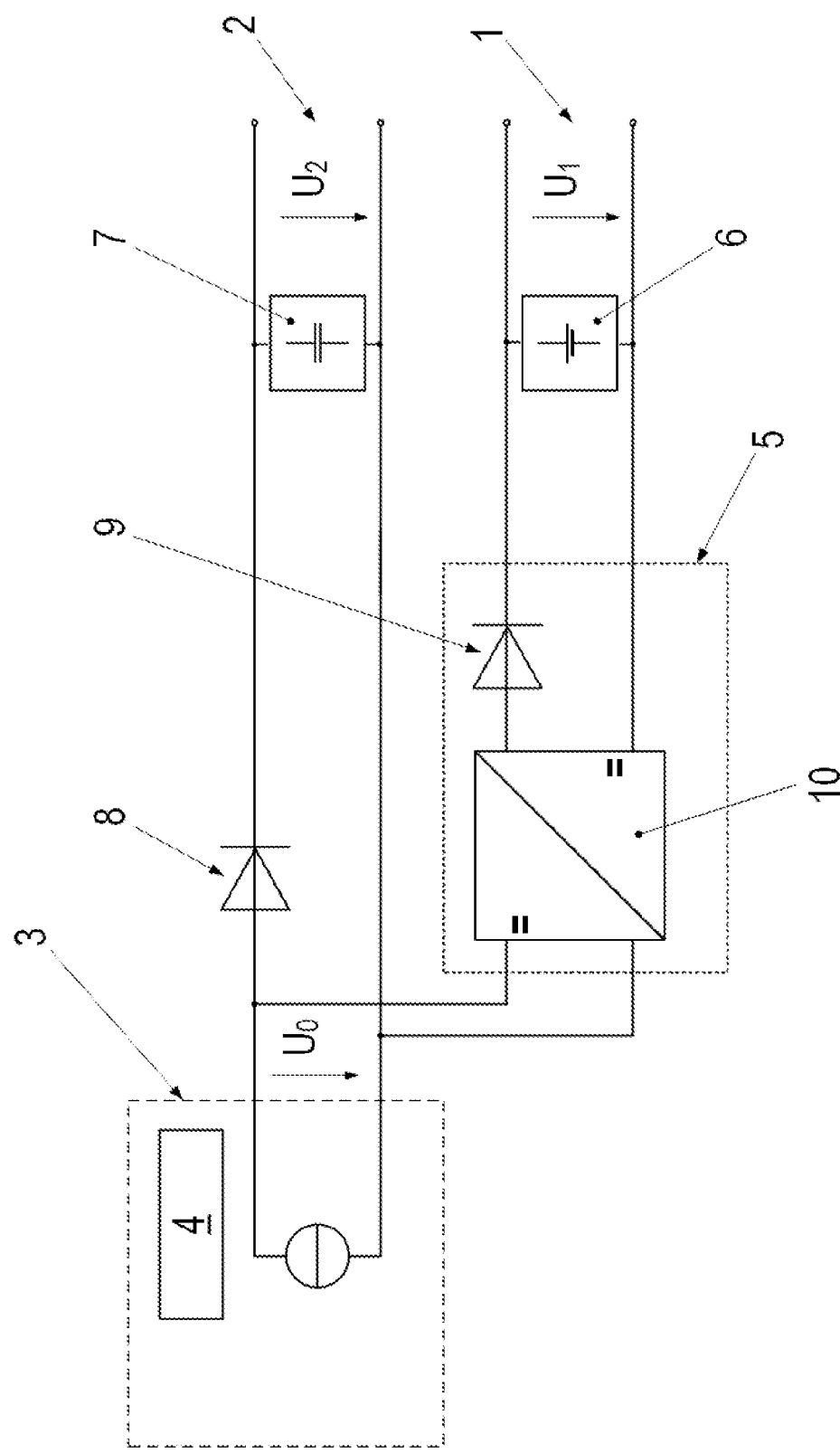
FIG. 1 schematically illustrates a device according to an example embodiment of the present invention for the voltage supply of two loads of a mobile assistance system. The mobile assistance system is also referred to as MAS below.

FIG. 1 schematically illustrates a device for the voltage supply of two loads with the DC voltages $U_1$ and $U_2$. For this purpose, the device includes a first DC voltage connection 1 and a second DC voltage connection 2, on which the DC voltages $U_1$ and $U_2$ are applied. For the energy supply, the device includes an energy supply unit 3 which, in this example embodiment, is arranged as a controllable current source. For this purpose, the energy supply unit 3 includes a controller 4 which regulates the output current of the energy supply unit 3 and thus controls the output DC voltage $U_0$. The energy supply unit 3 is connected without voltage converter to the second DC voltage connection 2. In the example embodiment illustrated in FIG. 1, between the energy supply unit 3 and the second DC voltage connection 2, a diode 8 is arranged, which allows a power flow in the direction of the second DC voltage connection, provided that the output DC voltage $U_0$ is greater than the forward voltage of the diode 8, and accordingly prevents, e.g., permanently, a power flow in the direction of the energy supply unit should the second DC voltage U2 be greater than the output DC voltage $U_0$. This would be the case, for example, if, on the second DC voltage connection 2, energy is fed in, for example, by an electric motor operated as generator. Another situation in which the diode blocks is the case in which no external energy is supplied to the energy supply unit 3 ($U_0$=0) and a voltage $U_2$ greater than zero is applied on the second DC voltage connection.

The first DC voltage $U_1$ on the first DC voltage connection differs from the second DC voltage $U_2$. For the application of the device in a MAS, DC voltages $U_2$ in the range of low voltages, e.g., in the range between 120 V and 600 V, e.g., 300 V, and DC voltages $U_1$ in the range of low voltages, e.g., 12 V, 24 V or 48 V, may be utilized.

In order to convert the DC voltage $U_2$ into the lower DC voltage $U_1$, a converter device 5 is present between the energy supply unit 3 and the first DC voltage connection 1. The converter device 5 is parallel connected to the second DC voltage connection 2, so that the output DC voltage $U_0$ as well is used as input voltage for the converter device 5.

For buffering and energy storage, the device includes two energy storages 6, 7. In this example embodiment, the first energy storage 6 is configured as battery storage and, for example, is implemented as a secondary electrochemical element. Likewise, a rechargeable battery is possible as energy storage 6. In this example embodiment, the second energy storage 7 is implemented as double layer capacitor. In the illustrated example embodiment, for example, in each case only a first energy storage and a second energy storage are shown. However, energy storage devices of modular configuration are also possible, each including multiple identical or different energy storages.

Energy is supplied to each energy storage by the energy supply unit 3. The energy storage can store this energy and make it available to a corresponding load. Each energy storage is in each case configured and optimized for the requirements of the corresponding load. The respective energy storage should therefore be able to deliver energy only to its particular load. For this purpose, it is provided that a power flow from one energy storage to another cannot occur. Thus, no transfer should occur.

In the present example embodiment, a power flow from the double layer capacitor 7 to the battery storage 6 is prevented by the diode 8 located between the double layer capacitor 7 and the connection of the converter device 5. A power flow from the battery storage 6 to the double layer capacitor 7 is prevented by the converter device 5. For this purpose, the converter device 5 is implemented as a unidirectional DC/DC converter. The unidirectionality is schematically illustrated by a diode 9 which, in this example, follows a nonelectrically isolated DC/DC converter 10. This arrangement is intended merely to illustrate the functionality of the converter device as unidirectional DC/DC converter, in which a power flow is possible only in direction of the battery storage 6.

Figure 2:
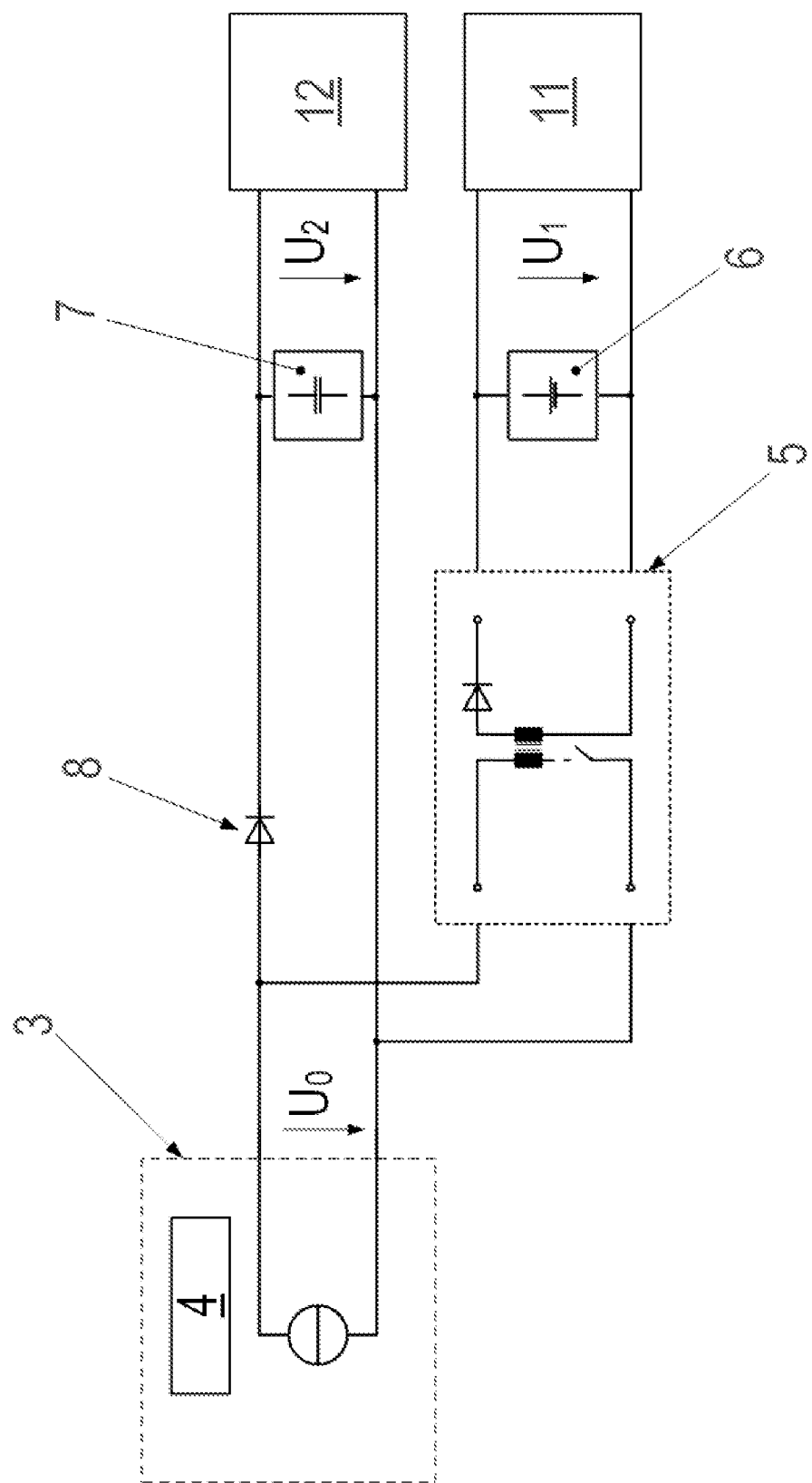
FIG. 2 schematically illustrates a mobile assistance system with two loads.

FIG. 2 illustrates an application of the device for the voltage supply of two loads in a MAS. In this example, the converter device 5 is implemented as a flyback converter. This is an example of an electrically isolated unidirectional DC/DC converter. Thus, a power flow from the battery storage 6 to the double layer capacitor 7 is prevented. A transfer from the double layer capacitor 7 to the battery storage 6 is prevented by the diode 8.

In this example embodiment, the first load 11 is configured as vehicle control. The vehicle control controls the driving movement of the MAS, for example. The control is supplied with the first DC voltage $U_1$ which is typically 12 V, 24 V, or 48 V. Other loads as well, which generally can be referred to as vehicle electronics, can be supplied with this DC voltage $U_1$, for example, security sensors such as laser scanners and corresponding evaluation electronics.

For the driving movement, the MAS has a drive device 12 which can be configured, for example, as 3-phase motor with upstream 3-phase inverter. The inverter converts the second DC voltage $U_2$ into a three-phase AC voltage with which the 3-phase motor, for example, a cage rotor, is operated. The drive device 12 can also include multiple motors which can each be operated by an individual inverter. In addition, the inverter can also be implemented as energy recovering, so that, when the drive motors are operated as generator, a charging of the double layer capacitor 7 is possible. In addition to drive devices for the traction of the MAS, other loads for the second DC voltage $U_2$ are also possible, such as, for example, lifting devices for picking up a load or handling devices for moving an object, for example, a robot arm. These loads 5 are supplied with the second DC voltage $U_2$ in the range from 120 V to 600 V.

The energy supply unit 3 for the vehicle can be implemented differently. For example, a simple charging apparatus with plug contact can be implemented, so that the MAS can be supplied with energy with contact at certain charging stations. Likewise, an energy supply with contact during travel of the MAS can be implemented, for example, by conductor lines. Alternatively, an energy supply without contact can be implemented, for example, an inductive energy supply. This can occur by coupled primary and secondary inductances. Both supplying at a stationary charging station and also supplying during the travel of the MAS are possible, for example, by primary conductors installed in or on the hall floor. When an external energy supply is present, the output DC voltage $U_0$ is provided by the energy supply unit 3. If no external energy supply is present, for example, because the MAS is travelling over a section without conductor lines or inductive supply, the output DC voltage $U_0$ is consequently zero.

The energy storages are configured primarily in order to supply the MAS with energy during operating phases in which the MAS has no external energy supply as previously described. This can be trips between stationary charging stations or trips which are remote from the primary conductor or conductor lines.

Since no transfer between the two energy storages is possible, the energy storages can each be configured and optimized for their particular task. The battery storage supplies the vehicle electronics, the consumption of which can be determined in advance. The consumption depends approximately on the duration of operation without external energy supply and, based on experience, requires greater safety margins for unforeseen disturbances which lead to waiting times. The double layer capacitor supplies the drives of the MAS, and their consumption depends approximately on the driving route without external energy supply, which can be planned well in advance, since the spatial arrangement of the charging infrastructure is known.

Figure 3:
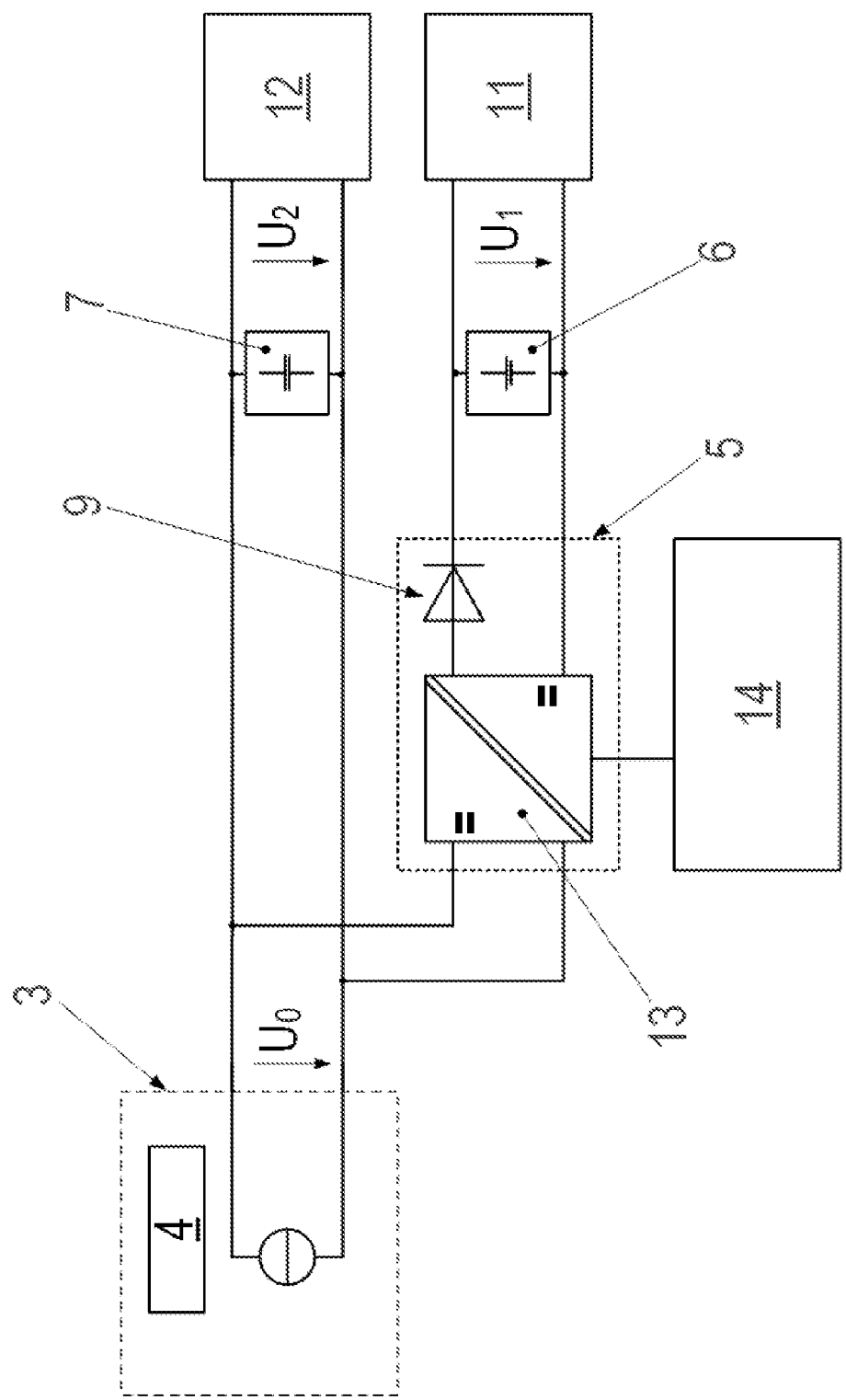
FIG. 3 schematically illustrates a mobile assistance system with two loads.

FIG. 3 schematically illustrates a MAS with two loads. Identical reference numerals denote identical components, and reference is made to the above explanations for such components. In this example, the converter device 5 includes an electrically isolated DC/DC converter 13. The diode 9 is again intended to symbolize that the converter device 5 is a unidirectional DC/DC converter. By this unidirectional DC/DC converter, a power flow from the battery storage 6 to the double layer capacitor 7 is prevented.

In contrast to the example embodiment illustrated in FIG. 2, in this example embodiment, there is no diode between the double layer capacitor 7 and the converter device 5, and for this reason, at any point in time, the voltage on the double layer capacitor, e.g., the second DC voltage $U_2$, corresponds to the output DC voltage $U_0$. Therefore, for the example embodiment without a diode, one speaks of a voltage level $U_2$, meaning the voltage value of the voltage which is applied in the example embodiment without a diode on the double layer capacitor and consequently also on the output of the energy supply unit 3. In the case of absence of external energy supply of the energy supply unit 3, in this example embodiment, the value of the output DC voltage $U_0$ is thus nevertheless greater than zero if the double layer capacitor still has a charge. It is even possible that $U_0$ or $U_2$ increases, even though no external energy supply is present, for example, if energy is fed in via the drive device 12 operated as generator. This is a difference from the example embodiments illustrated in FIGS. 1 and 2, in which the voltage values $U_0$ and $U_2$ can be different due to the diode 8, and the voltage levels $U_0$ and $U_2$ can thus differ in the time course for these example embodiments.

In the example embodiment illustrated in FIG. 3, the double layer capacitor 7 is directly connected to the converter device 5. It is also directly connected to the energy supply unit 3. Directly connected here means that no components which can influence, e.g., control or prevent, a power flow are arranged in between. In the present example embodiment, in order to prevent a transfer from the double layer capacitor 7 to the battery storage 6, e.g., permanently, e.g., at any point in time, a converter control 14 is used, which monitors the voltage value of the voltage level $U_2$ by a gradient evaluation. Thus, the second DC voltage $U_2$ is measured and its measurement over time is monitored. By the gradient evaluation, the converter control 14 checks to determine whether second DC voltage $U_2$ increases (positive gradient). Thus, a check is conducted to determine whether energy is fed into the double layer capacitor 7. This feeding in of energy can come from the energy supply unit 3 or from a load which temporarily generates energy, for example, an electric motor operated as generator. Due to the mentioned gradient evaluation, a diode between double layer capacitor 7 and converter device 5, as in the example embodiment illustrated in FIG. 1, can be dispensed with, e.g., a direct connection of the two components can be implemented. However, this direct connection is not absolutely necessary. Alternatively, such a diode could also be arranged in between.

To the extent that more energy is fed into the voltage level $U_2$ than is drawn therefrom (positive gradient of voltage level $U_2$), the converter control 14, e.g., starting at a charge level of the double layer capacitor 7, predefined by a minimum voltage value $U_{2,min}$, switches the converter device 5 on in order to charge the battery storage 6. This switching on can also be referred to as "activation." The minimum voltage value $U_{2,min}$ is, e.g., just below the usual target voltage value of the second DC voltage $U_2$, e.g., in the range of 80-95% of the target voltage value. If, for example, in normal operation, the goal is a second DC voltage $U_2$=300 V as target voltage, then, for example, a minimum voltage value of 280 V can be selected. Thereby, it is provided that, in the case of a positive gradient, first the double layer capacitor 7 is charged before the battery storage is also charged in parallel thereto.

If less energy is fed into the voltage level $U_2$ by the energy supply unit 3 than is drawn by the drive device 12 (no positive gradient of voltage level $U_2$), then the converter device 5 is switched off by the converter control 14. This switching off can also be referred to as "deactivation." This switching off process prevents a transfer from the double layer capacitor 7 to the battery storage 6.

For example, the MAS has safety measures for the protection of the energy storages. For this purpose, for example, charging current, voltage, and/or temperature of the energy storages are measured and evaluated in an appropriate evaluation device. When certain critical current, voltage or temperature values are reached, the energy storages are automatically deactivated in order to protect them from destruction.

LIST OF REFERENCE CHARACTERS

1 First DC voltage connection
2 Second DC voltage connection
3 Energy supply unit
4 Controller
5 Converter device
6 First energy storage device
7 Second energy storage device
8 Diode
9 9 Diode
10 DC/DC converter
11 First load
12 Second load
13 Electrically isolated DC/DC converter
14 Converter control
$U_0$ Output DC voltage
$U_1$ First DC voltage
$U_2$ Second DC voltage

The invention claimed is:

1. A method for operating an electric vehicle, including an electrical drive device adapted to drive the vehicle, a control device for controlling driving movement of the vehicle, a first energy storage device adapted to supply the control device with a first DC voltage, a second energy storage device adapted to supply the drive device with a second DC voltage, and an energy supply unit adapted to provide an output DC voltage, the first energy storage device being connected via a converter device to the energy supply unit, the second energy storage device being connected to the energy supply unit, the converter device adapted to convert the output DC voltage into the first DC voltage, comprising:
    preventing a first power flow from the first energy storage device to the second energy storage device; and
    preventing a second power flow from the second energy storage device to the first energy storage device.

2. The method according to claim 1, wherein the driving movement of the vehicle includes traction of the vehicle, the second energy storage device is chargeable and dischargeable more rapidly than the first energy storage device, the second DC voltage is greater than the first DC voltage, the energy supply unit is adapted to periodically provide the output DC voltage, and the converter is adapted to convert the output DC voltage into the first DC voltage in response to the first DC voltage being smaller than the output DC voltage.

3. The method according to claim 1, wherein the electric vehicle is arranged as a driverless mobile assistance system, the first energy storage device includes a rechargeable battery storage device, the second energy storage device includes a double layer capacitor device, the first power flow is always prevented, and the second power flow is always prevented.

4. The method according to claim 1, wherein an output current of the energy supply unit has a value substantially constant over time.

5. The method according to claim 4, wherein the output current is regulated to the value substantially constant over time.

6. The method according to claim 1, wherein energy is supplied to the energy supply unit with contact or without contact.

7. The method according to claim 1, wherein energy is supplied periodically to the energy supply unit during travel.

8. The method according to claim 1, wherein the converter device including a unidirectional and/or electrically isolated DC/DC converter to prevent the first power flow.

9. The method according to claim 1, wherein the second power flow is prevented by a diode arranged between the second energy storage device and the converter device.

10. The method according to claim 1, wherein the second energy storage device is directly connected to the energy supply unit and/or directly connected to the converter device, the second power flow is prevented by monitoring the second DC voltage by a gradient evaluation, the converter device being activated in response to a positive gradient of a voltage level of the second DC voltage and/or in response to the second DC voltage being greater than a minimum voltage value, the converter device being deactivated in response to a non-positive gradient of the voltage level of the second DC voltage.

11. The method according to claim 1, wherein the first DC voltage for charging the first energy storage device is varied.

12. The method according to claim 1, wherein the first DC voltage for charging the first energy storage device is varied by the control device.

13. The method according to claim 1, wherein the second energy storage device is adapted to receive more current than can be provided by the energy supply unit.

14. A device for supplying a first load of an electric vehicle with a first DC voltage and for supplying a second load with a second DC voltage, comprising:
- a first energy storage device adapted to supply the first DC voltage;
- a second energy storage device adapted to supply the second DC voltage;
- an energy supply unit adapted to supply an output DC voltage, the first energy storage device being connected via a converter device to the energy supply unit, the second energy storage device being connected to the energy supply unit;
- wherein the converter device is adapted to convert the output DC voltage into the first DC voltage;
- wherein the device is adapted to prevent a first power flow from the first energy storage device to the second energy storage device and to prevent a second power flow from the second energy storage device to the first energy storage device.

15. The device according to claim 14, wherein the electric vehicle is arranged as a driverless mobile assistance system of an intralogistics application, the first energy storage device includes a rechargeable battery storage device, the second energy storage device is arranged as a double layer capacitor device and/or is chargeable and dischargeable more rapidly than the first energy storage device, the energy supply unit is adapted to periodically supply the output DC voltage, the second DC voltage is greater than the first DC voltage, the converter device is adapted to convert the output DC voltage into the first DC voltage in response to the first DC voltage being smaller than the output DC voltage, and the device is adapted to always prevent the first power flow from the first energy storage device to the second energy storage device and to always prevent the second power flow from the second energy storage device to the first energy storage device.

16. The device according to claim 14, wherein the energy supply unit includes a controllable current source.

17. The device according to claim 14, wherein the first energy storage device is arranged removably and replaceable on the electric vehicle.

18. The device according to claim 14, wherein the first energy storage device includes an overvoltage protection, an undervoltage protection, and/or an overcurrent protection by a current measurement and/or a voltage measurement.

19. The device according to claim 14, wherein the first energy storage device includes an overtemperature protection by a temperature measurement.

20. The device according to claim 14, wherein the second energy storage device includes an overvoltage protection and/or an overcurrent protection by a current measurement and/or a voltage measurement.

21. The device according to claim 14, wherein the second energy storage device includes an overtemperature protection by a temperature measurement.

22. An electric vehicle, comprising:
- a device adapted to supply a first load of an electric vehicle with a first DC voltage and to supply a second load with a second DC voltage, including:
  - a first energy storage device adapted to supply the first DC voltage;
  - a second energy storage device adapted to supply the second DC voltage;
  - an energy supply unit adapted to supply an output DC voltage, the first energy storage device being connected via a converter device to the energy supply unit, the second energy storage device being connected to the energy supply unit;
  - wherein the converter device is adapted to convert the output DC voltage into the first DC voltage;
  - wherein the device is adapted to prevent a first power flow from the first energy storage device to the second energy storage device and to prevent a second power flow from the second energy storage device to the first energy storage device;
- an electrical drive device adapted to drive the vehicle; and
- a control device adapted to control driving movement of the vehicle;
- wherein the first energy storage device is adapted to supply the control device with the first DC voltage, and the second energy storage device is adapted to supply the drive device with the second DC voltage; and
- wherein the electric vehicle is adapted to perform a method including:
  - preventing the first power flow from the first energy storage device to the second energy storage device; and
  - preventing the second power flow from the second energy storage device to the first energy storage device.

23. The electric vehicle according to claim 22, wherein the electric vehicle is arranged a driverless mobile assistance system of an intralogistics application.

24. The electric vehicle according to claim 22, wherein the first load includes the control device and/or the second load includes an electrical drive device for the driving movement of the vehicle, a lifting device, or a handling device.

* * * * *